D. A. BYERLY.
ELECTRIC LIGHT SWITCH.
APPLICATION FILED AUG. 26, 1919.

1,343,109.

Patented June 8, 1920.
2 SHEETS—SHEET 1.

WITNESS:
Geo. Ackman Jr.

Dennis A. Byerly
INVENTOR.

BY
Victor J. Evans
ATTORNEY.

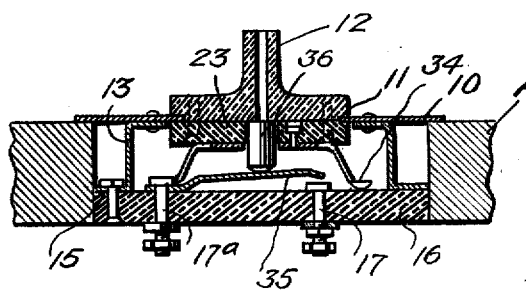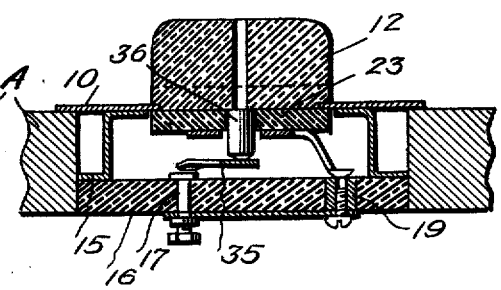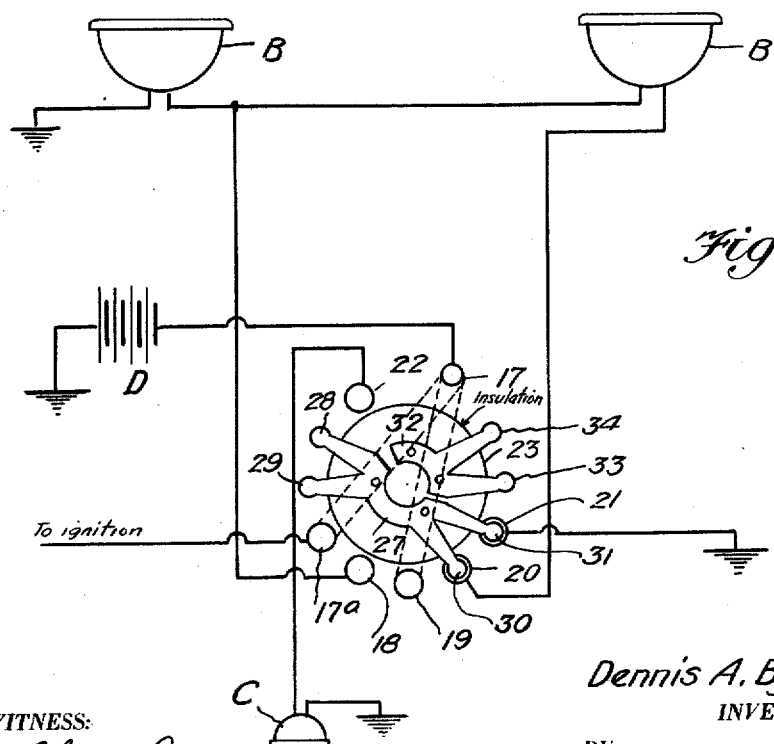

UNITED STATES PATENT OFFICE.

DENNIS A. BYERLY, OF TERRE HAUTE, INDIANA.

ELECTRIC-LIGHT SWITCH.

1,343,109.  Specification of Letters Patent.  Patented June 8, 1920.

Application filed August 26, 1919. Serial No. 319,895.

*To all whom it may concern:*

Be it known that I, DENNIS A. BYERLY, a citizen of the United States of America, residing at Terre Haute, in the county of Vigo and State of Indiana, have invented new and useful Improvements in Electric-Light Switches, of which the following is a specification.

This invention relates to control switches for automobiles and has for its object the provision of a switch by means of which current may be supplied from a battery or magneto to the headlights of an automobile and also to the tail light, the switch and connections being so arranged that the headlights may be connected in parallel to give a bright light or in series to give a dim light, the switch being also so constructed that a suitable ignition lock may be disposed at the center thereof.

An important object is the provision of a switch of this character which may also be constructed to control the ignition of the automobile as well as the lights, by an extremely simple movement.

An additional object is the provision of a switch of this character which will be very simple and inexpensive in manufacture, highly efficient in use, durable in service, not likely to get out of order, and a general improvement in the art.

With the above and other objects and advantages in view, the invention consists in the details of construction to be hereinafter more fully described and claimed, and illustrated in the accompanying drawings in which—

Figure 1:
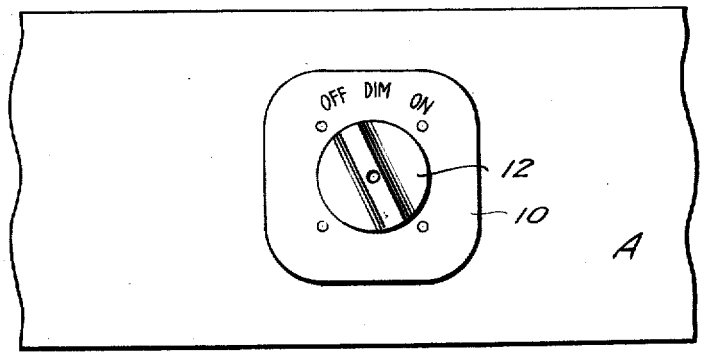
Figure 2:
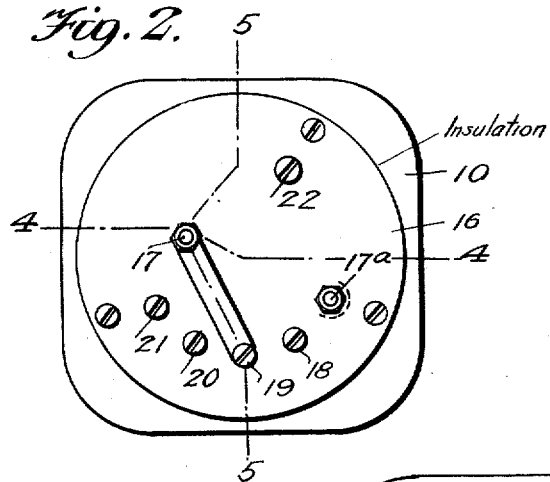
Figure 3:
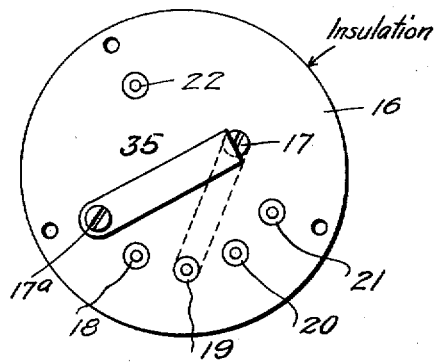
Figure 6:
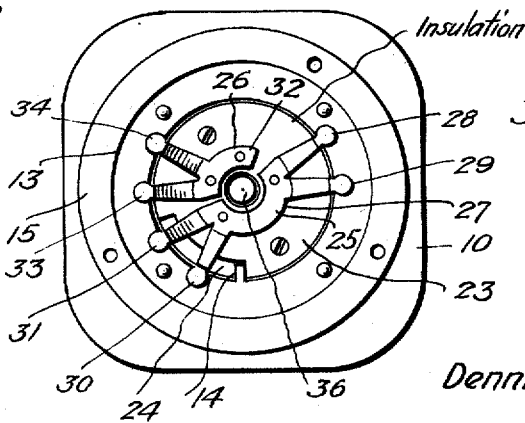

Figure 1 is a fragmentary view of the instrument board of an automobile with my switch in position, Fig. 2 is a rear elevation of the switch structure, Fig. 3 is an inside view of the back cover, Fig. 4 is a longitudinal sectional view, Fig. 5 is a sectional view at right angles to Fig. 4, Fig. 6 is an elevation showing the movable member, and Fig. 7 is a diagram of the electric circuit.

Referring more particularly to the drawings, the letter A designates the instrument board of an automobile, B designates the headlamps, C designates the tail lamp, and D designates a suitable source of current.

In carrying out my invention I provide a switch structure which comprises an attaching plate 10 adapted for disposition against the instrument board A and suitably secured thereto. This plate preferably carries the legends "Off," "Dim," and "On." The plate 10 is provided centrally with a circular hole 11 within which works and through which extends the switch handle 12. Disposed against the rear side of the plate 10 and secured thereto, is a cup-shaped metallic casing 13. This casing is provided with a circular opening back of the opening 11 and is also formed with a tongue 14. The casing 13 is provided with an outwardly extending flange 15 against which is disposed and to which is secured the back member 16 of the switch, this back member being formed of fiber or other suitable insulating material. Extending through and suitably secured within the back member 16 are contact members 17 and 17ª connected with the ignition system of the automobile and a series of contacts 18, 19, 20 and 21 arranged in the arc of a circle and another single contact 22.

Disposed within the casing 13 and secured to the handle member 12 is a supporting block 23 formed of fiber or other suitable insulating material. This block 23 is provided with a slot 24 of a 60° arc within which is engaged the projection 14 whereby movement of the block 23 by means of the handle member 12, will be limited to 60°.

Secured upon the block 23 are contact members 25 and 26. The contact member 25 is formed as a semi-circular ring 27 secured to the block 23 and extending therefrom a plurality of inclined spring fingers 28, 29, 30 and 31 adapted to engage the contacts 18, 19, 20, 21 and 22. The contact 26 comprises a portion of a ring 32 secured to the block 23 and spring fingers 33 and 34 engageable with the contacts 20 and 21. One of the ignition terminals 17 is connected with the source of current D, as is the contact 19 and the other terminal 17ª is connected with the ignition system of the automobile. I provide a leaf spring 35 secured to the contact 17ª and adapted to be moved into engagement with the contact 17 when a button 36 is engaged against the spring 35, as by insertion of a key through the handle member 12, this key structure being not shown. The contact 21 is connected with the ground and one terminal of the battery is also grounded.

The operation of the device is as follows:—

When the switch is in the off position and the contact fingers 30 and 31 are in engagement with the contacts 20 and 21 no current will flow through any of the lamps.

When the switch is turned to the dim position the spring finger 28 will be in engagement with the contact 22, the spring finger 30 will be in engagement with the contact 19, and the spring finger 31 will engage the contact 20 whereupon current may flow from the sources through the contacts and through the head lamps in series, the head lamps being consequently lighted dimly while the tail light is lighted brightly.

When the switch is turned to the "on" position, the finger 29 will engage the contact 22, the finger 30 will engage the contact 18 and the finger 31 will engage the contact 19, the finger 33 will engage the contact 20, and 34 will engage 21. Current will then flow from the source D, to 17, to contact 19, finger 31, segment 27, finger 29, contact 22, through tail light C to the ground. At the same time, the current passing through segment 27, will divide, a part going through finger 30, contact 18, and to the wire connecting the head lamps. Upon reaching this wire, the current again divides, one portion passing through the left lamp to the ground, and a portion passing through the right headlight to contact 20, through segment 32, and finger 34 to the ground. The headlights, as well as the tail light, will then be energized and all will be in parallel and brightly lighted.

From the foregoing description and a study of the drawings it will be apparent that I have thus provided an extremely simple and inexpensive control switch whereby the head lamps of an automobile may be connected in series to give a dim light or connected in parallel to give a bright light, the tail light being brightly lighted in both cases.

While I have shown and described the preferred embodiment of my invention it is of course to be understood that I reserve the right to make such changes in the form, construction, and arrangement of parts as will not depart from the spirit of the invention or the scope of the subjoined claim.

Having thus described my invention, I claim:—

A control switch of the character described comprising a stationary front plate provided with a hole, a cup-shaped casing secured to the rear face of said plate and having an outwardly extending flange, a rear plate of insulating material secured to said flange and forming a rear closure, a plurality of contacts arranged in circumferential series on said rear plate, a circular handle member extending through the opening in said front plate, a block of insulating material secured to said handle member within said casing, and a pair of contact members secured upon said block, one of said last named contact members including a pair of spring fingers engageable selectively with one of the contacts carried by said back plate and further including a pair of spring fingers selectively engageable with certain of said contact members and the other second named contact member including a pair of spring fingers selectively engageable with the remaining ones of said first named contact members.

In testimony whereof I affix my signature.

DENNIS A. BYERLY.